United States Patent
Koenig et al.

(10) Patent No.: US 10,113,428 B2
(45) Date of Patent: Oct. 30, 2018

(54) FLOW ROTOR, IN PARTICULAR TURBINE WHEEL

(71) Applicant: BorgWarner Inc., Auburn Hills, MI (US)

(72) Inventors: Igor Koenig, Frankenthal (DE); Michael Loewenberg, Weierhof/Bolanden (DE)

(73) Assignee: BorgWarner Inc., Auburn Hills, MI (US)

( * ) Notice: Subject to any disclaimer, the term of this patent is extended or adjusted under 35 U.S.C. 154(b) by 291 days.

(21) Appl. No.: 14/355,309

(22) PCT Filed: Nov. 9, 2012

(86) PCT No.: PCT/US2012/064290
§ 371 (c)(1),
(2) Date: Apr. 30, 2014

(87) PCT Pub. No.: WO2013/074393
PCT Pub. Date: May 23, 2013

(65) Prior Publication Data
US 2014/0308137 A1    Oct. 16, 2014

(30) Foreign Application Priority Data
Nov. 15, 2011 (DE) .......................... 10 2011 118 601

(51) Int. Cl.
| | | |
|---|---|---|
| *F01D 5/02* | (2006.01) | |
| *F01D 5/34* | (2006.01) | |
| *B23P 15/00* | (2006.01) | |

(52) U.S. Cl.
CPC .............. *F01D 5/02* (2013.01); *B23P 15/006* (2013.01); *F01D 5/34* (2013.01); *F05D 2220/40* (2013.01); *F05D 2300/17* (2013.01); *F05D 2300/174* (2013.01); *F05D 2300/522* (2013.01)

(58) Field of Classification Search
CPC . B23P 15/006; F01D 5/02; F01D 5/34; F05D 2220/40; F05D 2300/14; F05D 2300/174; F05D 2300/522; F05D 2300/17
USPC .............................. 416/241 A, 241 B, 241 R
See application file for complete search history.

(56) References Cited

U.S. PATENT DOCUMENTS

| | | | | |
|---|---|---|---|---|
| 4,257,744 A | * | 3/1981 | Watson | F04D 29/266 403/282 |
| 4,494,287 A | * | 1/1985 | Cruzen | B23K 35/304 164/101 |
| 4,581,300 A | * | 4/1986 | Hoppin, III | B23K 20/00 228/175 |

(Continued)

FOREIGN PATENT DOCUMENTS

| | | | | |
|---|---|---|---|---|
| JP | S 55-134701 A | * | 10/1980 | F01D 5/02 |
| JP | 2011137379 A | | 7/2011 | |

OTHER PUBLICATIONS

International Search Report in International Application No. PCT/US2012/064290, dated Mar. 28, 2013.

*Primary Examiner* — William McCalister
(74) *Attorney, Agent, or Firm* — Eric L. Doyle; Stephan A. Pendorf; Patent Central LLC

(57) ABSTRACT

A flow rotor (1), in particular a turbine wheel, having a wheel core (2) and an outer part (3) which surrounds the wheel core (2) and is connected thereto. The wheel core (2) and the outer part (3) are constructed from different materials.

10 Claims, 2 Drawing Sheets

(56) References Cited

U.S. PATENT DOCUMENTS

| | | | | |
|---|---|---|---|---|
| 4,721,394 A * | 1/1988 | Casto | B01F 7/00341 | 366/330.2 |
| 4,735,556 A * | 4/1988 | Fujikake | F01D 25/145 | 165/904 |
| 4,907,947 A * | 3/1990 | Hoppin, III | C22C 19/056 | 148/514 |
| 5,931,186 A * | 8/1999 | Skoglund | G05D 7/0133 | 137/486 |
| 6,056,856 A * | 5/2000 | Graf | B01D 19/0057 | 162/190 |
| 6,190,033 B1 * | 2/2001 | Rickman | B01F 3/04531 | 366/265 |
| 6,291,086 B1 * | 9/2001 | Nguyen-Dinh | B23K 20/12 | 148/530 |
| 6,551,064 B1 * | 4/2003 | Mannava | C21D 10/005 | 29/889.7 |
| 6,635,362 B2 * | 10/2003 | Zheng | C23C 30/00 | 416/241 R |
| 7,000,306 B2 * | 2/2006 | Rice | B23K 20/021 | 29/281.1 |
| 7,241,416 B2 * | 7/2007 | Sweetland | F01D 5/048 | 419/6 |
| 7,481,625 B2 * | 1/2009 | Kim | F01D 5/048 | 416/185 |
| 2002/0040581 A1 * | 4/2002 | Finger | F01D 15/10 | 60/607 |
| 2004/0202539 A1 * | 10/2004 | Blank | F04D 25/02 | 415/206 |
| 2006/0127244 A1 | 6/2006 | Frankenstein et al. | | |
| 2006/0222503 A1 | 10/2006 | Fledersbacher et al. | | |
| 2008/0219853 A1 * | 9/2008 | Baker | F01D 5/02 | 416/241 R |
| 2012/0301307 A1 * | 11/2012 | Yang | B23K 20/129 | 416/213 R |
| 2014/0308137 A1 * | 10/2014 | Koenig | F01D 5/34 | 416/241 B |

* cited by examiner

FLOW ROTOR, IN PARTICULAR TURBINE WHEEL

BACKGROUND OF THE INVENTION

Field of the Invention

The invention relates to a flow rotor, in particular a turbine wheel.

Description of the Related Art

A flow rotor of this kind, which is formed in particular as a turbine wheel of an exhaust-gas turbocharger, has a wheel hub having a core, on the outside of which there is arranged an outer part with guide blades. In the case of the turbine wheel of the generic type, the wheel core and the outer part consist of the same material, such that a homogeneous turbine wheel is formed.

By way of contrast, it is an object of the present invention to provide a flow rotor, in particular a turbine wheel, of the type indicated in the preamble of claim 1 which has an improved moment of inertia and a reduced mass.

BRIEF SUMMARY OF THE INVENTION

By virtue of the fact that the wheel core and the outer part are constructed from different materials, it is possible, by a suitable material selection, to reduce the weight of the wheel core, such that as a whole the moment of inertia of the flow rotor or turbine wheel according to the invention is improved and the mass thereof is reduced.

The dependent claims contain advantageous developments of the inventions.

BRIEF DESCRIPTION OF THE SEVERAL VIEWS OF THE DRAWINGS

Further details, features and advantages of the invention become apparent from the following description of exemplary embodiments with reference to the drawing, in which.

DETAILED DESCRIPTION OF THE INVENTION

Figure 1:
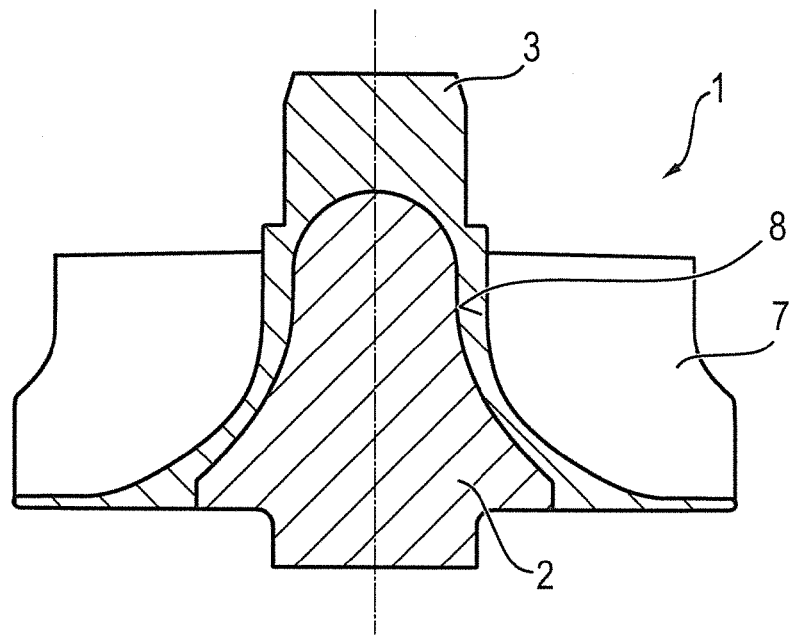
FIG. 1 shows a sectional illustration through a first embodiment of a flow rotor according to the invention, which in the example is formed as a turbine wheel.

FIG. 1 shows a sectional illustration of a flow rotor 1, which in the example is formed as a turbine wheel. In principle, however, it is also possible that the flow rotor can form a compressor wheel. Flow rotors of this kind are used, for example, in exhaust-gas turbochargers as a turbine or compressor wheel.

Figure 3:
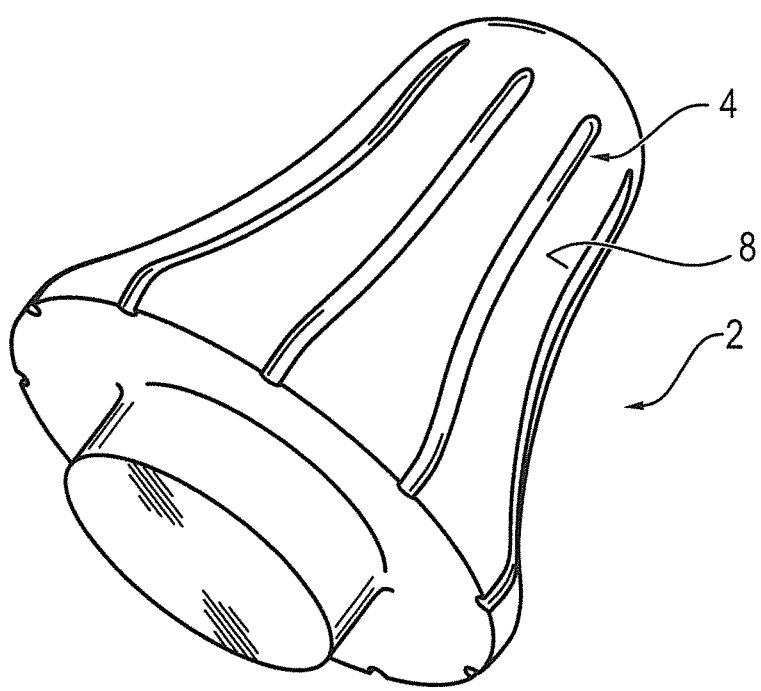
FIG. 3 shows a perspective illustration of an embodiment of a wheel core of the flow rotor according to the invention.

The turbine wheel 1 has a wheel core 2 which, in the example, has a bell-like cross section. The outer face 8 of the wheel core 2 is provided with an outer part 3, which is provided with a plurality of blades, of which one blade 7 is provided with a reference number in the sectional illustration. According to the invention, the wheel core 2 is produced from a different material than the outer part 3. To improve the moment of inertia and to reduce the mass, the material of the outer part 3 has a lower density than the material of the wheel core 2. To connect the wheel core 2 and the outer part 3, the outer face 8 of the wheel core 2 may be provided with a suitable coating, in order to make it possible to achieve a better connection between the wheel core 2 and the outer part 3. Furthermore, as is evident from the illustration in FIG. 3, it is possible to provide the wheel core 2 with a form-fitting connection device 4, which, in the example shown in FIG. 3, is constructed from a plurality of grooves running in the longitudinal direction of the wheel core 2.

To connect the wheel core 2 and the outer part 3, it is possible, for example, to weld these to one another or to connect them to one another in a composite casting process.

Figure 2:
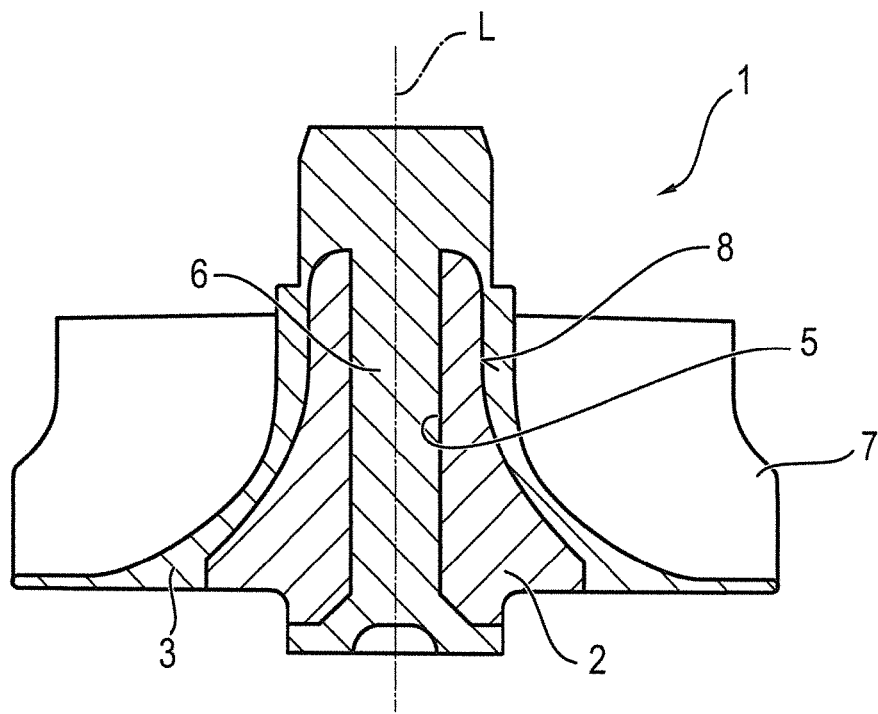
FIG. 2 shows an illustration, corresponding to FIG. 1, of a second embodiment of the flow rotor.

An example of welding is shown in the embodiment according to FIG. 2. In this case, the wheel core 2 has a continuous longitudinal center recess 5 which extends along the longitudinal axis L and into which a weld pin 6 is inserted. In this case, the weld pin 6 consists of the same material as the outer part 3, with the advantage that a standard welding process (for example a friction welding process or an EB welding process) can be used. In the embodiment shown in FIG. 2, too, the material of the outer part 3 or of the weld pin 6 has a lower density than the material of the wheel core 2 for reducing the mass and for improving the moment of inertia.

To connect the wheel core 2 and the outer part 3, the weld pin 6 is inserted into the longitudinal center recess 5 and then welded to the outer part 3.

An example of the material of the wheel core 2 is a nickel-based alloy.

The material of the outer part 3 and of the weld pin 6 may be titanium aluminide or ceramic.

In addition to the welding and composite casting connection processes mentioned above, other common connection processes are, of course, also conceivable.

In addition to the written disclosure of the invention above, reference is hereby made explicitly to the diagrammatic illustration thereof in FIGS. 1 to 3.

LIST OF REFERENCE SIGNS

1 Flow rotor, in particular turbine wheel
2 Wheel core/boss
3 Outer part/outer skin
4 Form-fitting connection device
5 Longitudinal center recess/longitudinal bore
6 Weld pin
7 Guide blade
8 Outer face of the wheel core 2
L Longitudinal center axis

The invention claimed is:
1. A radial flow exhaust gas turbocharger turbine wheel (1) having a turbine wheel hub (2, 3) and turbine wheel blades (7), the turbine wheel hub (2, 3) having a wheel hub axis,
wherein said turbine wheel is adapted for receiving a radially directed flow of exhaust gas and converting exhaust energy into rotational energy for driving a compressor wheel,
wherein the turbine wheel hub includes a turbine wheel hub core (2) and a turbine wheel hub outer part (3) which radially surrounds the turbine wheel hub core (2) the turbine wheel hub core (2) being coaxial with said wheel hub axis, having a bell-shaped cross-section having a base and a peak, and
the turbine wheel outer part (3) shaped for redirecting radially directed inflow to axial outflow the turbine wheel blades (7) extending outward from the hub outer part (3) and axially located between said base and said peak,
wherein the turbine wheel hub core (2) is made of a nickel-based alloy and the turbine wheel hub outer part (3) and turbine blades (7) are made of titanium aluminide or ceramic.

2. The turbine wheel as claimed in claim 1, wherein the turbine wheel core (2) is provided with a coating applied to the outer face (8) thereof.

3. The turbine wheel as claimed in claim 1, wherein the turbine wheel core (2) is connected to the outer part (3) via a form-fitting connection device (4).

4. The turbine wheel as claimed in claim 1, wherein the turbine wheel core (2) is provided with a continuous longitudinal center recess (5).

5. The turbine wheel as claimed in claim 1, wherein the material of the outer part (3) is titanium aluminide.

6. The turbine wheel as claimed in claim 1, wherein the material of the outer part (3) is ceramic.

7. The turbine wheel as claimed in claim 1, wherein the turbine wheel is a boreless turbine wheel.

8. An exhaust gas turbocharger turbine wheel (1) having a turbine wheel hub (2, 3) and turbine wheel blades (7),
wherein said turbine wheel is adapted for receiving a radially directed flow of exhaust gas and converting exhaust energy into rotational energy for driving a compressor wheel,
wherein the turbine wheel hub includes a turbine wheel hub core (2) and a turbine wheel hub outer part (3) which surrounds the turbine wheel hub core (2) and is connected thereto and is shaped for redirecting radially directed inflow to axial outflow,
wherein the turbine wheel hub core (2) is made of a first material and the turbine wheel hub outer part (3) and turbine blades (7) are made of a second material having a lower density than the first material,
wherein the turbine wheel core (2) is provided with a continuous longitudinal center recess (5), and
wherein the turbine wheel core (2) and the outer part (3) are connected by means of a weld pin (6), which extends through the longitudinal center recess (5) and is formed from the same material as the outer part (3).

9. An exhaust gas turbocharger including
a compressor wheel in a compressor housing,
a turbine wheel (1) in a turbine housing, connected via a shaft to the compressor wheel, the shaft having a shaft axis (L),
the turbine wheel having a turbine wheel hub (2, 3) including
a turbine wheel hub core (2) and a turbine wheel hub outer part (3) the hub outer part provided radially surrounding the turbine wheel hub core (2) the turbine wheel hub core (2) having a bell-shaped cross-section and extending axially between a base and a peak,
wherein turbine wheel blades (7) extend radially outward from the hub outer part (3) and are axially located between said hub core (2) base and peak, and
wherein the turbine wheel hub core (2) is made of a nickel-based alloy and the turbine wheel hub outer part (3) and turbine blades (7) are made of titanium aluminide or ceramic.

10. The turbocharger as claimed in claim 9, wherein the turbine wheel is a boreless turbine wheel.

* * * * *